United States Patent [19]

Albach et al.

[11] Patent Number: 4,992,921

[45] Date of Patent: Feb. 12, 1991

[54] CIRCUIT ARRANGEMENT FOR SUPPLYING A LOAD

[75] Inventors: Manfred Albach, Aachen, Fed. Rep. of Germany; Hubert Raets, Nieuwenhagen, Netherlands

[73] Assignee: U.S. Philips Corporation, New York, N.Y.

[21] Appl. No.: 445,582

[22] Filed: Nov. 30, 1989

[30] Foreign Application Priority Data

Nov. 30, 1988 [DE] Fed. Rep. of Germany ....... 3840304

[51] Int. Cl.$^5$ .................... H02M 1/12; H02M 1/14
[52] U.S. Cl. ......................... 363/44; 363/87; 363/89; 363/124; 363/126
[58] Field of Search .............. 363/44, 45, 46, 84, 363/86, 87, 89, 124, 125, 126

[56] References Cited

U.S. PATENT DOCUMENTS

| | | | |
|---|---|---|---|
| 3,764,886 | 10/1973 | Zarowin | 363/45 |
| 4,622,474 | 11/1986 | Christl et al. | 363/45 |
| 4,821,166 | 4/1989 | Albach | 363/89 |
| 4,855,890 | 8/1989 | Kammiller | 363/126 |

*Primary Examiner*—R. Skudy
*Assistant Examiner*—Jeffery Sterrett

*Attorney, Agent, or Firm*—Bernard Franzblau

[57] ABSTRACT

A circuit arrangement for supplying a load (15) with energy from a power supply mains (1 to 5; 21, 22, 23) conveying at least one alternating voltage (UW; R, S, T) includes a simple network to ensure both a uniform energy supply of the load (15) and a reliable suppression of interference from the load to the power supply mains and in the reverse direction by means of a rectifier arrangement (7 to 10) which for each terminal (4, 5; 21, 22, 23), of the power supply mains includes a rectifier stage (7, 8; 9, 10; 24, 25; 26, 27; 28, 29) constituted as a first branch of a bridge rectifier. For each rectifier stage an energy storage device (11; 12; 30; 31; 32) can be charged by and is connected to said stage in accordance with a complementary branch of the bridge rectifier. For each stage a switching element (13; 14; 33; 34; 35) is provided for connecting each energy storage device to the load. A control circuit (18; 36; 191, 192) switches the switching elements—cyclically following the charge of the energy storage devices from the power supply mains, via the rectifier stages. The switching elements are switched to conduct outside of the charge time intervals of the storage devices (i.e. the conducting phases of the rectifier stages).

30 Claims, 6 Drawing Sheets

CIRCUIT ARRANGEMENT FOR SUPPLYING A LOAD

BACKGROUND OF THE INVENTION

This invention relates to a circuit arrangement for supplying a load with energy from an alternating voltage power supply mains.

German Patent Application P 37 22 337.2, to which U.S. Pat. No. 4,821,166 corresponds, describes a circuit arrangement for transferring electric power from an alternating voltage source which is connected during given time intervals to an energy storage device for the purpose of supplying it with energy, which arrangement has a switch which is periodically activated by a control circuit for deriving the energy from an energy storage device. In this circuit arrangement high frequency disturbances produced therein are suppressed, i.e. kept away from the alternating voltage source, in that the control circuit makes the switch conducting only at times outside the time intervals in which the alternating voltage source is connected to the energy storage device. This arrangement is particularly useful in switched-mode power supplies which derive energy from a mains alternating voltage thereby generating interference voltages and currents due to the switching processes of the periodically activated switch, but which interference voltages and currents should not be introduced into the source of alternating voltage. The connection or separation of the alternating voltage source and the energy storage device is preferably effected by a rectifier stage. In the time intervals in which the rectifier stage is in the conducting state for the purpose of recharging the energy storage device, the activation of the switch is interrupted so that this switch does not introduce any interference via the conducting rectifier stage into the alternating voltage source, i.e. the mains.

However, interrupting the activation of the switch also interrupts the supply of energy to a load which is fed by the switched mode power supply so that this load is periodically and not uniformly supplied with energy.

SUMMARY OF THE INVENTION

It is an object of the invention to provide a circuit arrangement which with simple means ensures both a uniform energy supply of the load and a reliable suppression of interferences from the load to the power supply mains and vice versa.

In a circuit arrangement of the type described in the opening paragraph, this object is solved by a rectifier arrangement which for each terminal of the power supply mains comprises a rectifier stage constituted as a first branch of a bridge rectifier, for each rectifier stage an energy storage device which can be charged via and is connected to said stage in accordance with a complementary branch of the bridge rectifier, for each storage device a switching element for connecting each energy storage device to the load, and a control circuit by which the switching elements are switchable to conduct outside charge time intervals (conducting phases of the rectifier stages)—cyclically following the charging of the energy storage devices from the power supply mains via the rectifier stages.

The invention provides the possibility of suppressing interferences with a circuit arrangement of a simple construction and which provides a uniform, uninterrupted energy supply of the load. Elaborate high-frequency filters of conventional types are not required for this purpose. Interferences originating from the power supply mains and from the load can be suppressed with the circuit arrangement. It is suitable both for single-phase and for multi-phase power supply mains, i.e. power supply mains having an arbitrary number of terminals each conveying an alternating voltage, and it is constructed in such a way that an adaptation to the number of terminals of the power supply mains can easily be effected by joining circuit modules. The dimensioning of circuit parts already present need not be changed when further parts for additional terminals of the power supply mains are added.

In operation the energy storage devices are cyclically charged with energy from the power supply mains via the rectifier stages for all terminals of the power supply mains. In the same cycle, but shifted with respect to time, the energy storage devices are connected via the switching elements to the load for supplying the energy to this load. The rectifier stages are preferably uncontrolled or switched to conduct or to be blocked by the alternating voltage supplied thereto from the power supply mains. The control circuit is preferably controlled by the conducting phases of the rectifier stages for activating the switching elements.

The time intervals in which the switching elements are switched to conduct (conducting phases of the switching elements) preferably adjoin each other in a non-overlapping manner. This ensures on the one hand that one of the energy storage devices is always connected to the load for transferring energy; but, on the other hand, a direct conducting connection between any two energy storage devices is avoided. Consequently, balancing processes which occur between interconnected, differently charged energy storage devices and which cause energy losses can be avoided.

According to the invention, a circuit arrangement for supplying energy from a power supply mains which has at least two terminals is arranged such that the conducting phase of each switching element starts at an instant at which the voltage at the associated terminal of the power supply mains becomes smaller than at least one of the voltages at the other terminals and extends over a part of the period of the alternating voltage corresponding to the number of terminals. For example, in a two-terminal power supply mains energy from a first energy storage device is supplied to the load via an associated switching element during the first half cycle of the alternating voltage, while during the second half cycle of the alternating voltage a second energy storage device is connected to the load via an associated, second switching element. In a corresponding manner the first energy storage device is charged by the power supply mains in the second half cycle and the second energy storage device is charged in the first half cycle.

Analogously, the period of the alternating voltage in a power supply mains having, for example, three terminals (for example a three-phase supply network) is divided into three parts. The conducting phase of a rectifier stage is then preferably in one part of the period in which the voltage at the power supply mains terminal connected to this rectifier stage is larger than the voltages at the two other terminals. If this ratio is reversed with reference to at least one of the voltages at the two other terminals, the conducting phase of the rectifier stage is terminated, i.e. the rectifier stage changes over to the blocked state. In the period up to the next conducting phase of the rectifier stage, which period begins at this instant, the conducting phase of the associated switching element can take place, thus ensuring that the energy storage device is each time connected either to the power supply mains or to the load.

For a simple realisation of the afore-described method the voltages of the power supply mains terminals can be applied to the control circuit for controlling the switching elements. The voltages can be compared in the control circuit by means of simple comparator arrangements so as to obtain the afore-described criteria for initiating and terminating the conducting phases of the switching elements. Apart from a comparison of the voltages at the individual terminals of the power supply mains, a comparison with a reference voltage level, for example a zero potential, can also be evaluated.

The switching elements are preferably in the form of transistors, and a diode is included in each energy transfer circuit between each one of the energy storage devices and the load via the associated switching element. These diodes reliably prevent balancing processes between the energy storage devices in the case of different levels of changing.

For suppressing so-called in-phase currents which are evenly introduced into all terminals of the power supply mains, starting in particular from the load via parasitic capacitances and which close over parts of the rectifier stages, the switching elements are advantageously connected to a first terminal of the load and the diodes are connected to a second terminal of the load, while furthermore the diode-facing connections between the rectifier stages and the associated energy storage devices are cyclically interchanged in accordance with the succession of the conducting phases. The diodes then have a dual function.

For a very simple and reliable control of the switching elements dependent on the conducting phases of the rectifier stages, the control circuit comprises an impedance network for each switching element, each network having a tap connected to the associated terminal of the power supply mains, a first end terminal which is connected to a control terminal of the switching element and a second end terminal which is connected to the terminal of the associated energy storage device remote from the switching element. Moreover, this impedance network does not require its own supply voltage. The control voltages supplied to the control terminals of the switching elements can be combined in a simple manner by means of further control voltages for further control functions to be realised with the switching elements.

If a switched mode power supply is provided as a load, the switching elements may advantageously be used as chopper switches of the switched mode power supply so as to economize on components. To this end the switching elements can be clocked with an additional control signal of a higher frequency during their conducting phases. Particularly, the control circuit also comprises in this case a device for controlling the switching elements dependent on the voltage which is present at the energy storage device supplying energy to the load and on the energy taken up by the load. More specifically, the switching elements are controlled by means of pulsewidth-modulated signals.

In a further advantageous embodiment the control circuit is adapted in such a way that after the occurrence of a disturbance in an alternating voltage of the power supply mains by which the charge of one of the energy storage devices is disturbed, particularly after a halfwave of this alternating voltage has dropped out, the cycles of the conducting phases of the switching elements are accelerated after predetermined periods by given time intervals until the original association of the conducting phases with the alternating voltage is reached again. It is achieved thereby that the load is also continuously supplied with energy when a dropout of an alternating voltage of the power supply mains or a disturbance of the same type or the same effect occurs on the power supply mains. In principle it is possible, by corresponding large dimensioning of the energy storage devices, to also bridge longer drop-outs of an alternating voltage. The afore-described switching sequence of the switching elements, however, provides the possibility of bridging disturbances of the type described with an unchanged dimensioning of the energy storage devices. As a result the protection from interference can be achieved without any increase of the design of the circuit arrangement. Due to the said switching sequence the succession in which the conducting phases of the switching elements occur, particularly with respect to that which is associated with the imperfectly supplied energy storage device, is replaced by a succession in which the switching elements are switched to conduct with respect to those energy storage devices in which energy was stored at least substantially correctly. Only when, in the next period of the disturbed alternating voltage, the relevant energy storage device is charged again is the associated switching element again controlled in a conducting phase. The switching prescription essentially decreases the time intervals of the conducting phases so that in the intervals in which energy for the load is taken from the energy storage devices the energy which is absent in an energy storage device during a halfwave is supplied by the other energy storage devices until the normal operating condition is reached, i.e. the original association of the conducting phases with the alternating voltage. In principle, other switching sequences also are possible; said switching sequence is, however, connected with the normal cyclic succession and can be derived therefrom by using simple control means.

For detecting the occurrence of interference in an alternating voltage, it is possible to detect either this voltage at the input of the rectifier arrangement or the voltages at the energy storage devices. The switching sequence in the case of interference is initiated, for example, when a charge coming below a threshold value is detected at one of the energy storage devices at the end of a halfwave of the associated alternating voltage.

BRIEF DESCRIPTION OF THE DRAWINGS

Embodiments of the invention will now be described in greater detail with reference to the accompanying drawings, in which.

DESCRIPTION OF THE PREFERRED EMBODIMENTS

Figure 1:
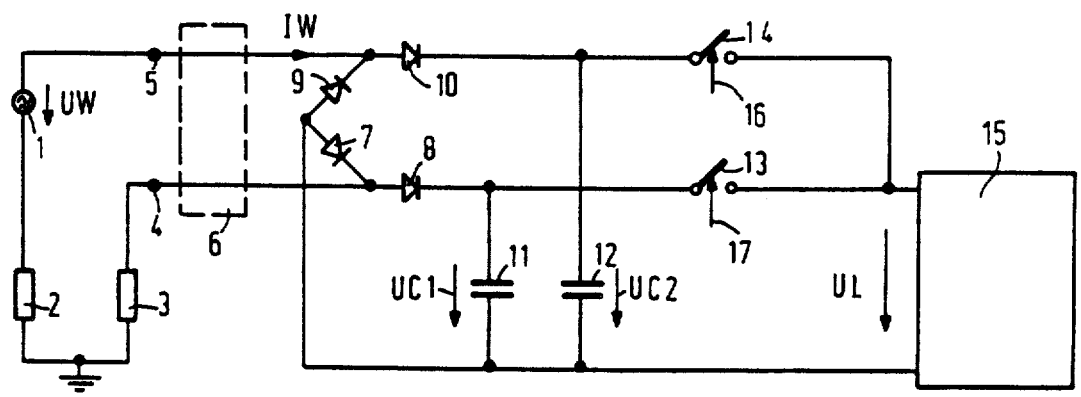
FIG. 1 shows a first embodiment.

FIG. 1 shows a first embodiment of a circuit arrangement for supplying a load 15 with energy from a power supply mains having two terminals 4 and 5, shown by way of its equivalent circuit diagram and formed from a voltage source 1 supplying a mains alternating voltage UW and two ground-symmetrically arranged mains impedances 2 and 3. The terminals 4, 5 of the AC power supply 1 to 5 are connected to a rectifier arrangement consisting in the present case of four diodes 7 to 10, in which the diodes 7 and 8 on the one hand and the diodes 9 and 10 on the other hand each represent a rectifier stage in the form of a first branch of a bridge rectifier. The first rectifier stage constituted by the diodes 7, 8 is connected to the first terminal 4 of the power supply mains 1 to 5, and the second rectifier stage constituted by the diodes 9 and 10 is connected to the second terminal 5 of the power supply mains 1 to 5.

An energy storage device 11, 12 is connected to each rectifier stage 7, 8 and 9, 10, respectively, in accordance with a complementary branch of the bridge rectifier, i.e. the energy storage device 11, 12 connects the DC terminals of the branch of the bridge rectifier in the associated rectifier stages 7, 8 and 9, 10, respectively.

Each energy storage device 11, 12 is connected to the load 15 via a switching element 13, 14, respectively. If the associated switching element 13, 14 is rendered conducting, energy from the energy storage device 11, 12, respectively, can flow into the load 15. This energy flow is interrupted by blocking the switching elements 13, 14. The switching elements 13, 14 are activated by a control circuit, not shown, in this Figure, via control terminals 17, 16, respectively.

Figure 2:
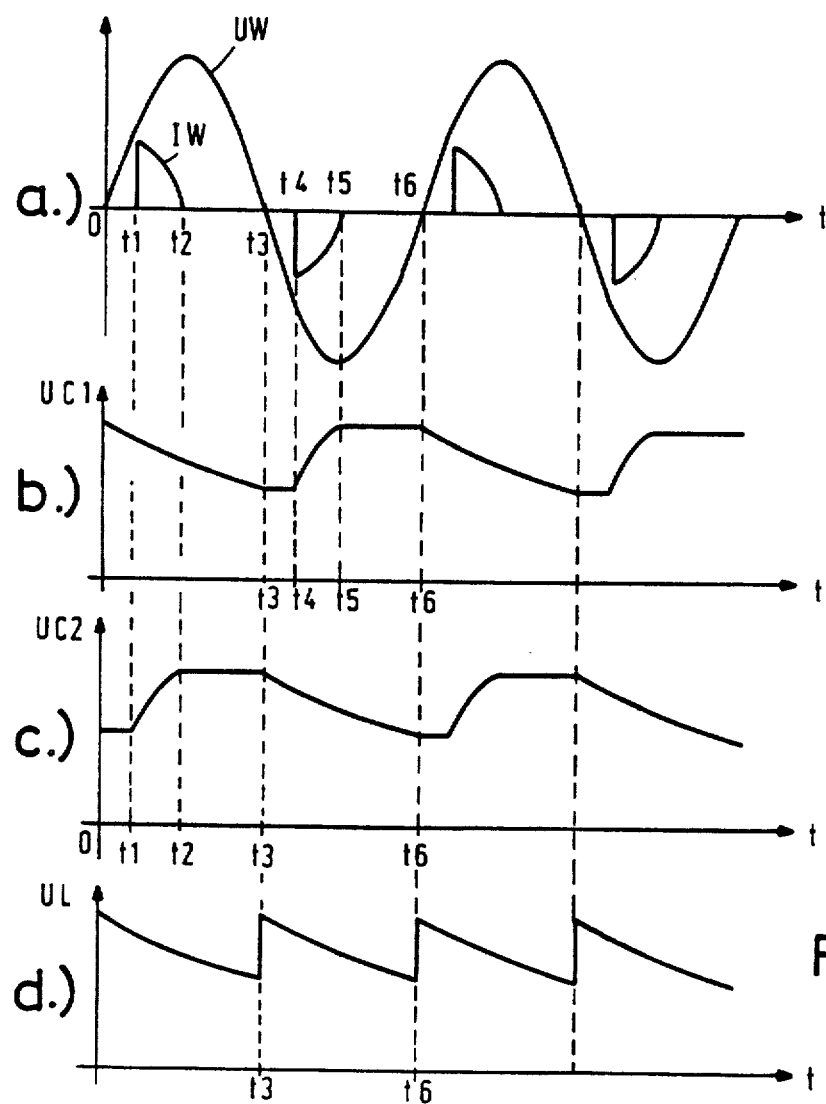
FIG. 2 shows some diagrams to explain the operation of the arrangement according to FIG. 1.

FIG. 2 shows some current and voltage waveforms which illustrate how the circuit arrangement according to FIG. 1 functions in normal operation. In FIG. 2a the mains alternating voltage UW is plotted as a sinewave with respect to time t, starting with a positive halfwave. FIGS. 2b and 2c show the variations with respect to time of the voltages UC1 and UC2 at the first and second energy storage devices 11 and 12, which are in the form of capacitors in the embodiment of FIG. 1. FIG. 2d shows the variation with respect to time of the voltage UL at the load 15.

During the positive halfwave of the mains alternating voltage UW the first switching element 13 is in its conducting state, i.e. in its conducting phases, while the second switching element 14 is blocked. Consequently, only the first energy storage device 11 is connected to the load 15. As long as the rectifier stages 7, 8 and 9, 10 are blocked, the variation with respect to time of the voltage UC1 at the first energy storage device 11 is only determined by the supply of energy to the load 15, while the voltage UC2 at the second energy storage device 12 is constant. If the mains alternating voltage UW exceeds the value of the voltage UC2 at the instant t1, the diode 10 of the second rectifier stage begins to conduct. A charge current IW flows via this diode from the power supply mains 1 to 5 into the second energy storage device 12. The current circuit for the charge current IW closes across the equally conducting diode 7 of the first rectifier stage 7, 8. The voltage UC2 then increases proportionally with the mains alternating voltage UW until it decreases again after UW passes its peak at the instant t2. The diodes 7, 10 are then blocked, the voltage UC2 remains subsequently remains constant and the charge current IW disappears.

At the zero-crossing of the mains alternating voltage UW at the instant t3 the switching elements 13, 14 are switched by the control circuit (not shown). During the subsequent negative halfwave of the mains alternating voltage UW the second switching element 14 assumes its conducting phase while the first switching element 13 is brought to the blocked state. The load 15 is now supplied from the second energy storage device 12. Consequently, the voltage UC2 starts decreasing from the instant t3 while the voltage UC1 at the first energy storage device 11 remains initially constant as it is still electrically separated both from the load 15 and from the power supply mains 1 to 5.

When the level of the mains alternating voltage UW, i.e. the instantaneous value of the voltage at the first terminal 4 of the power supply mains 1 to 5, exceeds the value of the voltage UC1 at the first energy storage device 11 at the instant t4, its charging begins via the diode 8 of the first rectifier stage 7, 8 with a corresponding completion of the charge current path via the diode 9 of the second rectifier stage 9, 10. The now negative charge current IW flows until at the instant t5 the mains alternating voltage UW passes its peak and the diodes 8, 9 then change over to the blocked state. The voltage UC1 therefore remains constant until another zero-crossing of the mains alternating voltage UW at the instant t6, while the voltage UC2 continues to decrease between t5 and t6.

After the instant t6 the described operation between the instants t1 to t5 is repeated.

In the described manner of operation (normal operation) the conducting phases of the associated rectifier stages 7, 8 and 9, 10 and the conducting phases of the connected switching elements 13, 14 are separated with respect to time for each energy storage device 11, 12, respectively, so that the energy storage devices are either connected only to the power supply mains 1 to 5 or only to the load 15. A through-connection between the power supply mains 1 to 5 and the load 15 is thereby avoided so that interferences cannot be transferred via this path. However, as is shown in FIG. 2d, at all times one of the energy storage devices 11, 12 is connected to the load 15 so that it is continuously supplied with energy. In a corresponding manner the voltage UL at the load 15 is always at a value which differs from zero. The extent to which the voltages UC1 and UC2 and hence the voltage UL in the associated conducting phases of the switching elements 13, 14 decrease is dependent on the energy consumption of the load 15. If this energy consumption and hence the current supply from the energy storage devices 11, 12 increases, the voltage UL exhibits a greater decrease during the separate halfwaves of the mains alternating voltage UW. The energy storage devices 11, 12 are preferably dimensioned in such a way that the voltage UL at the instant of the zero-crossings of the mains alternating voltage UW, and hence at the instant of switching over between the conducting phases of the switching elements, still has a voltage value which is just permissible as a minimum value at the maximum possible current and hence energy supply to the load 15.

In the manner of operation shown in FIG. 2 the first switching element 13 remains non-conducting outside the conducting phase of the diodes 8 and 9 in the periods between the instants t3 and t4 and between t5 and t6. In principle, these periods may be utilized either by the rectifier stages 7, 8 and 9, 10 or by the switching elements 13, 14 for extending their conducting phases. Particularly with a larger discharge of the energy storage devices 11, 12 by the load 15 and the associated greater decrease of the voltages UC1 and UC2, the period between the instants t3 and t4 will at least partly be used for charging the energy storage devices 11 and 12. The period between the instants t5 and t6 could then be used for extending the conducting phase of the switching element 13. This also applies to the conducting phase of the second switching element 14. In the periods in which the two switching elements 13, 14 conduct, the voltage between the two energy storage devices 11, 12 is balanced, which is accompanied by energy losses. Concerning these energy losses the conducting phases of the switching elements 13, 14 will therefore advantageously adjoin each other in a non-overlapping manner.

FIG. 1 further shows a high-frequency filter 6 in broken lines which can optionally be arranged in the leads from the terminals 4 and 5 of the power supply mains to the rectifier arrangement 7 to 10. This filter can suppress possible interferences of very high frequencies, which interferences are passed by junction or parasitic capacitances of the diodes 7 to 10 under certain circumstances. Such a high-frequency filter is, however, only provided if very high-frequency interference components of a comparatively large amplitude are present.

Figure 3:
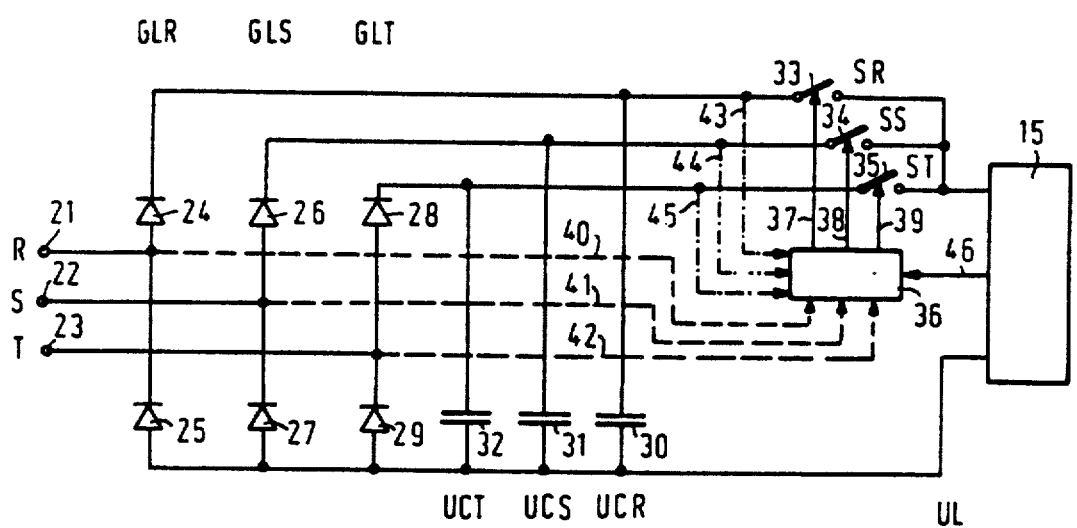
FIG. 3 shows a second embodiment.
Figure 4:
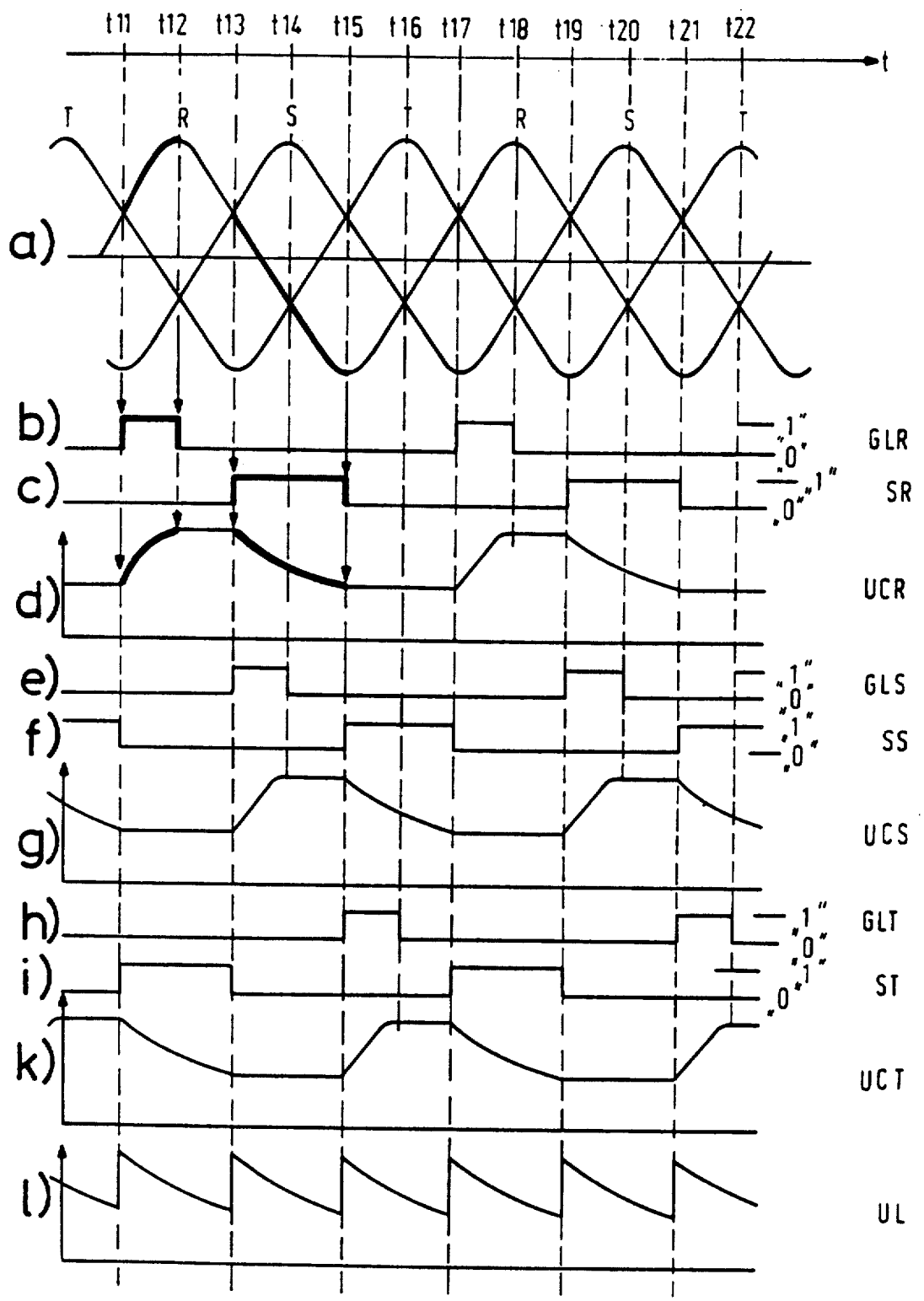
FIGS. 4 and 5 show diagrams for different operations of the arrangement of FIG. 3.
Figure 5:
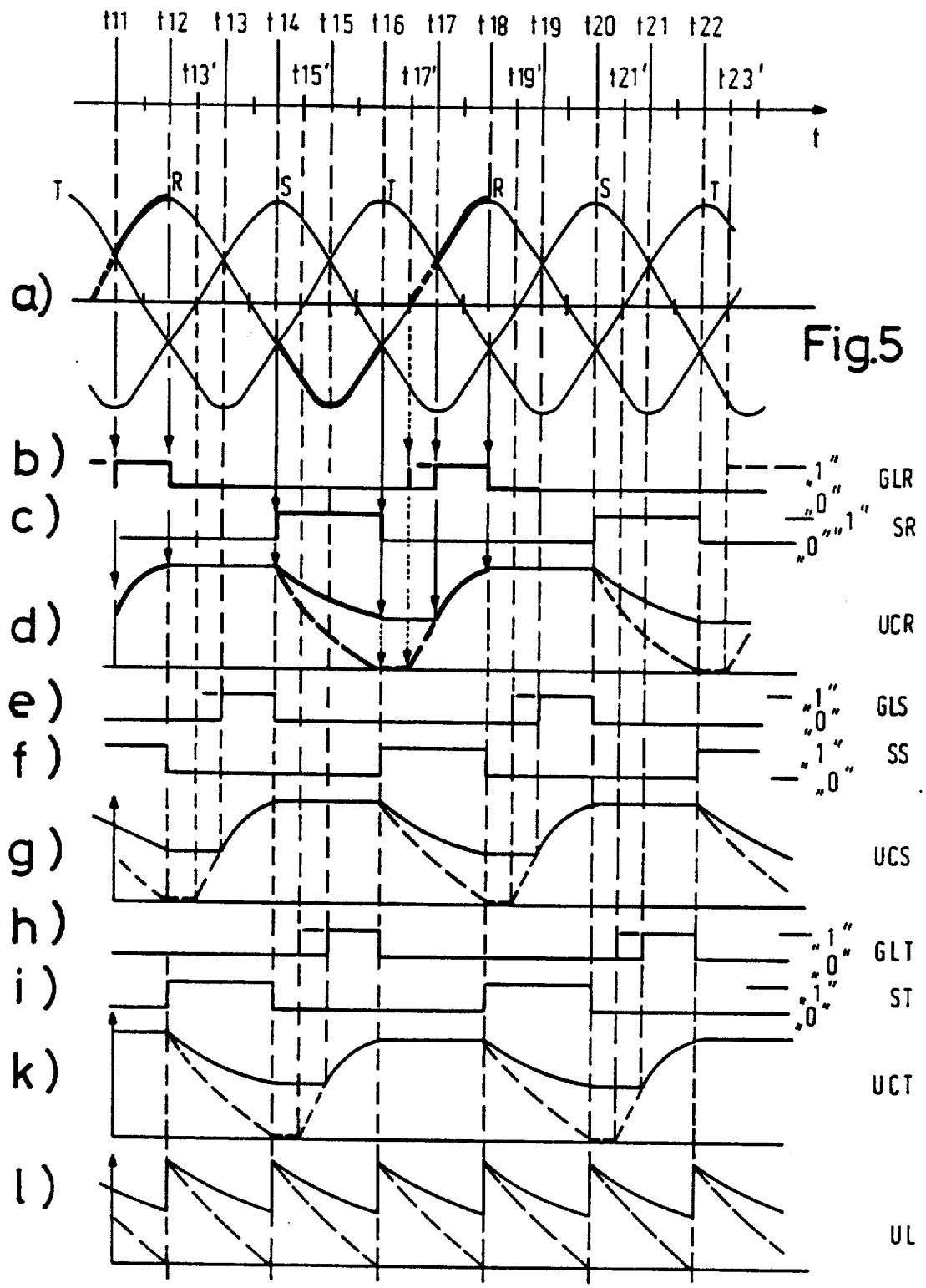

FIG. 3 shows an embodiment of a circuit arrangement according to the invention for operation with a three-terminal AC supply conveying at its three terminals 21, 22, 23 the alternating voltages denoted by R, S and T of a three-phase current network. FIG. 4 shows a first mode of operation and FIG. 5 shows two further modes of operation of the arrangement according to FIG. 3.

The rectifier arrangement of FIG. 3 has three rectifier stages with two diodes 24, 25, 26, 27 and 28, 29 each. Each rectifier stage 24, 25, 26, 27 an 28, 29 is connected to one of three energy storage devices 30, 31 and 32, respectively, in the form of capacitors in the same way as in FIG. 1. The energy storage devices 30, 31 and 32 are connected to the load 15 via switching elements 33, 34 and 55, respectively. The voltages occurring at the energy storage devices 30, 31 and 32 are denoted by UCR, UCS and UCT, respectively, and the voltage at the load is denoted again by UL. The references GLR, GLS and GLT, and SR, SS and ST are status variables to clarify the conducting and blocked states of the rectifier stages, particularly the diodes 24, 26, 28 and to represent the conducting phases of the switching elements 33, 34, 35. The last character of these references designates the associated alternating voltage R, S, T of the three-phase current network.

FIG. 3 further shows a control circuit 36 which controls the switching elements 33, 34 and 35 via control terminals 37, 38 and 39, respectively. For a correct control of the conducting phases of the switching elements 33 to 35 with respect to time the alternating voltages R, S, T from the terminals 21 to 23 of the power supply mains as well as the voltages UCT, UCS, UCR at the energy storage devices 30 to 32 are applied to the control circuit. The corresponding leads are shown in broken lines and in dot-and-dash lines and have the reference numerals 40, 41, 42 and 43, 44, 45.

In the diagram according to FIG. 4 all variations with respect to time of the voltages shown and the status variables are plotted versus time on a common time axis. FIR. 4a shows the alternative voltages R, S and T at the terminals 21, 22 and 23, respectively, of the power supply mains, which voltages are each shifted by 120° in phase in the conventional manner. These alternating voltages are not only applied via the rectifier stages 24 to 29 for charging the energy storage devices 30 to 32 but also via the leads 40 to 42 to the control circuit 36. For example, with the aid of known comparator circuits it is detected therein at which instants the instantaneous values of the alternating voltages R, S, T pair-wise correspond to each other or the pair-wise difference between these voltages changes sign. Subsequently the conducting phases of the switching elements 33 to 35 are initiated via the control terminals 37 to 39. In the embodiment shown the conducting phase of the first switching element 33 according to FIG. 4c is started when the value of the alternating voltage R at the first terminal 21 comes below the value of the alternating voltage S at the second terminal 22. This conducting phase extends over one third of the period of the alternating voltages R, S, T; in the diagram according to FIG. 4 this is the period between the instants t13 and t15. In FIG. 4c the state variable SR assumes the value "1" in this period. At the instant t15 the control circuit 36 detects the reversal of the sign of the difference between the alternating voltages S and T and in a corresponding manner a conducting phase is initiated for the second switching element 34 which continues until the instant t17. In FIG. 4f this is shown by way of the status variable SS. In a corresponding manner the conducting phase of the third switching element 35 shown by way of the status variable ST in FIG. 4i is initiated at the instant t17 with reference to the comparison between the alternating voltages T and R. The conducting phases are thus started at an instant at which the alternating voltage at the associated terminal becomes smaller than at least one of the other alternating voltages and they extend—in a non-overlapping adjoining manner—through a part of the period of the alternating voltages R, S, T corresponding to the number of terminals of the power supply mains.

In this way a simple control of the conducting phases is achieved in addition to the advantages described with reference to FIG. 1.

In conformity with the conducting phases of the switching elements 33, 34, 35 the energy storage devices 30, 31, 32 are connected to the load 15 and the voltages UCR, UCS and UCT present at the storage devices decrease in conformity with their discharge, i.e. the supply of energy to the load. In the diagrams of FIGS. 4d, g and k these variations in the periods t13 to t15, t15 to t17 and t17 to t19 are shown by way of example and are repeated with the period of the alternating voltages R, S, T. For the period t13 to t15 the variations with respect to time are accentuated by means of fatter solid lines.

In the embodiment shown the energy storage devices 30, 31, 32 are charged during the period in which the alternating voltage R, S, T at the associated terminal 21, 22, 23, respectively of the power supply mains exceeds the other alternating voltages. For the alternating voltage R at the first terminal 21 this is, for example the interval t11 to t12 in which the diode 24 becomes conducting—shown by way of a change-over of the status variable GLR to state "1"—and in which the voltage UCR follows the alternating voltage R. After the peak value of the alternating voltage R is passed at the instant t12, the value of the voltage UCR at the first energy storage device 30 remains initially constant because the first rectifier stage, particularly diode 24 is blocked. Accordingly, GLR assumes the value "0"—and the conducting phase of the first switching element 33 has not yet started. In this interval the status variable SR is still at the value "0". The relationships between the voltages and the status variables during charging of the energy storage devices are also accentuated for the example of the alternating voltage R by means of fat solid lines. The corresponding relationships are repeated in a corresponding manner in the diagrams according to FIGS. 4e, g, h and k for the voltages UCS and UCT and the status variables GLS and GLT.

The voltage UL at the load 15 is shown in FIG. 4l; it is composed, similarly to FIG. 2, of the voltage variations UCR, UCS and UCT during each conducting phase of the switching elements 33, 34, 35.

FIG. 5 shows two modifications of the mode of operation according to FIG. 4. In accordance therewith the voltages and state variables are shown in sequence in a similar manner. The conducting phases of the individual switching elements 33, 34, 35 are now initiated only at an instant when the associated alternating voltage R, S, T becomes smaller than all other alternating voltages. In the example of the alternating voltage R this is shown for the period t14 to t16 and accentuated by a wide solid line. On the other hand the time intervals for charging the energy storage devices 30, 31, 32 remain unchanged, i.e. for the alternating voltage R between the instants t11 and t12, t17 and t18, etc. As compared with the state of operation according to FIG. 4 the period in time between a conducting phase of a switching element 33, 34, 35 and the time interval of charging the associated energy storage device 30, 31, 32 is reduced while the period in time between the interval for charging and the subsequent conducting phase of the associated switching element is increased to the same extent. Otherwise, however, the same processes occur again and the diagram therefore shows the same waveforms.

Particularly when the load 15 is constructed as a switched mode power supply which can also be supplied with a very low voltage UL, the capacitance of the energy storage devices 30, 31, 32 can be dimensioned to be so small that in the case of the maximum possible energy taken up by the load 15 the voltage UL at the end of the conducting phases of each switching element 33, 34, 35 considerably decreases or decreases at least substantially to the value of zero. This requires an adaptation of the operation of the chopper switch arranged in the switched mode power supply to these low voltages, particularly by way of a pulsewidth modulation of the signals controlling the switch.

The resultant mode of operation is shown in FIG. 5 by means of broken lines. The conducting phases of the switching elements 33, 34, 35 remain unchanged as far as their position with respect to time is concerned; only the voltages UCR, UCS and UCT and, in a corresponding manner, the voltage UL are shown while decreasing to the value of zero. As a result the time interval of charging the energy storage devices 30, 31, 32 starts earlier, namely at the instants t13′, t15′, t17′, t19′, t21′ and t23′ instead of, as was hitherto the case, at the instants t13, t15, t17, t19, t21 and t23, respectively. The start of the conducting phases of the rectifier stages which is moved to these earlier instants is shown by way of the broken lines in the diagrams of FIGS. 5b, e, and h for the status variables GLR, GLS and GLT, respectively.

It appears that this dimensioning enables the overall value of the capacitances of the energy storage devices 30, 31, 32 when capacitors are used, to be chosen to be a factor of 5 smaller than the capacitances for the storage capacitors which are conventionally used in connection with mains rectifiers. Nevertheless no so-called mains hum is transferred by the switched mode power supply constituted by the load 15. At this operating state the extension of the time intervals for charging the energy storage devices 30, 31, 32 is also advantageous so that the harmonics of the charge currents derived from the terminals 21, 22, 23 of the power supply mains can be reduced in amplitude. This also contributes to the reduced introduction of interference by the load 15.

To economize on separate chopper switches in the load 15, which takes the form of a switched mode power supply, the switching elements 33, 34, 35 may preferably be controlled by the control circuit 36 via the control terminals 37, 38, 39 during their conducting phases in conformity with the chopper switch, i.e. they are clocked particularly with the pulsewidth-modulated signals in accordance with the energy taken up by the load. The control signal required for this purpose is applied to the control circuit 36 via a load current control lead 46 from the load 15. The control circuit 36 has for example a clock oscillator whose clock signal is pulsewidth-modulated by the control signal and is supplied to the control terminals 37, 38, 39 in accordance with the conducting phases.

Figure 6:
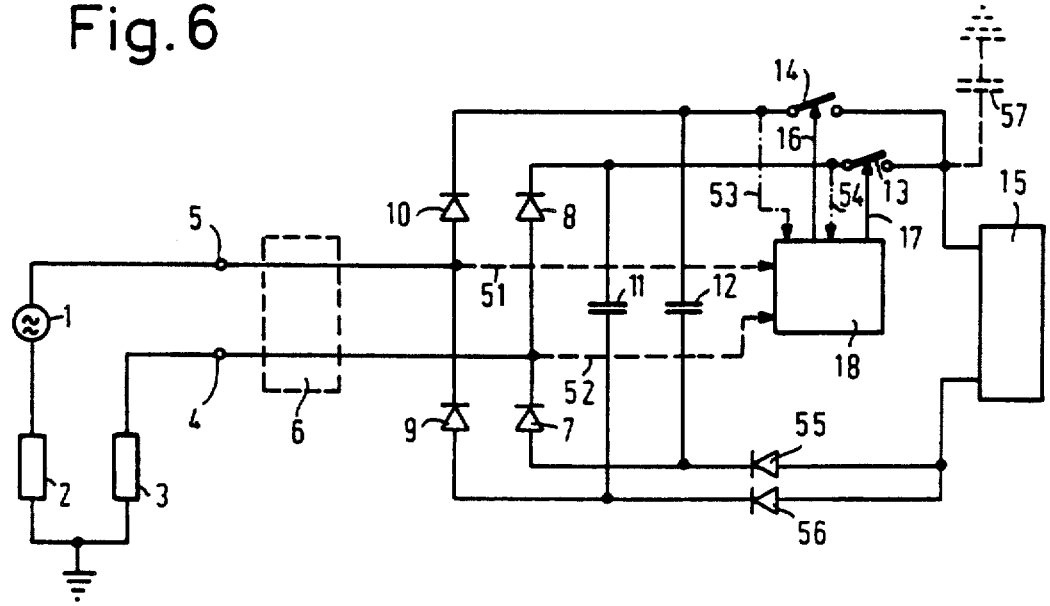
FIG. 6 shows a third embodiment.

FIG. 6 shows a modification of the arrangement of FIG. 1 in which corresponding components have the same reference numerals. In addition, a control circuit 18 is shown, which has the corresponding functions of the control circuit 36 of FIG. 3, for the two-terminal power supply mains of this embodiment. Also in accordance with FIG. 3 the voltages at the terminals 4, 5 of the power supply mains 1 to 5 are applied to this control circuit via leads 51, 52 and the voltages UC1 and UC2 at the energy storage devices 11, 12 are applied to this circuit via leads 53, 54.

If the switching elements 13, 14 are formed as transistors, it is efficient to arrange a diode in each energy transfer circuit between one of the energy storage devices 11 and 12 and the 15, 15 which circuit is closed via the switching elements 13 and 14, by which diode the reverse voltage which is present in the case of a different charge of the energy storage devices 11 and 12 at a different switching element is taken up during the conducting phase of one of the switching elements 13 and 14. These diodes can be directly arranged in series with the switching elements 13, 14.

In FIG. 6 the diodes—having reference numerals 55 and 56—are not directly connected in series with the switching elements 13, 14 but to a second terminal of the load 15 remote from the switching elements 13, 14 in the energy transfer circuit between the energy storage devices 11, 12 and the load 15. Additionally, the connections facing the diodes 7, 9 of the rectifier arrangement between the rectifier stages 7, 8 and 9, 10 and the associated energy storage devices 11, 12 are cyclically interchanged. With a two-terminal power supply mains this interchange can be simply carried out by connecting the diode 7 of the rectifier arrangement to the second energy storage device 12 instead of to the first energy storage device 11 and by connecting the diode 9 to the first energy storage device 11 instead of to the second energy storage device 12. In the case of multiphase power supply mains these terminals must be cyclically interchanged in accordance with the sequence of the conducting phases of the associated switching elements.

Due to this measure not only the exchange of energy between the energy storage devices 11 and 12 is interrupted but the diodes 55, 56 in this arrangement also contribute to a strong reduction of so-called in-phase interference currents. These in-phase interference currents are particularly produced if—as explained with reference to FIG. 3—the switching elements 13, 14 are simultaneously clocked as chopper switches for the load 15. Very steep jumps of the electrical potential are then produced at the junction point between the switching elements 13, 14 and the load 15. These jumps are derived with respect to ground potential via a parasitic capacitance 57 which is always present in the circuit arrangement and introduced into the power supply mains 1 to 5 via the ground connection of this mains. During the conducting phases of the rectifier stages, in which the diodes 7 and 9 are alternately conducting, current circuits for the in-phase interference currents would be closed across these diodes and the load impedances 2 and 3 as well as the load 15. The diodes 55, 56 interrupt these current circuits for the in-phase interference current because one of the two diodes 55, 56 is blocked, i.e. conveys no current due to the blocked associated switching elements 13, 14, which is connected to a just conducting diode 7 or 9 in the rectifier arrangement 7 to 10.

Figure 7:
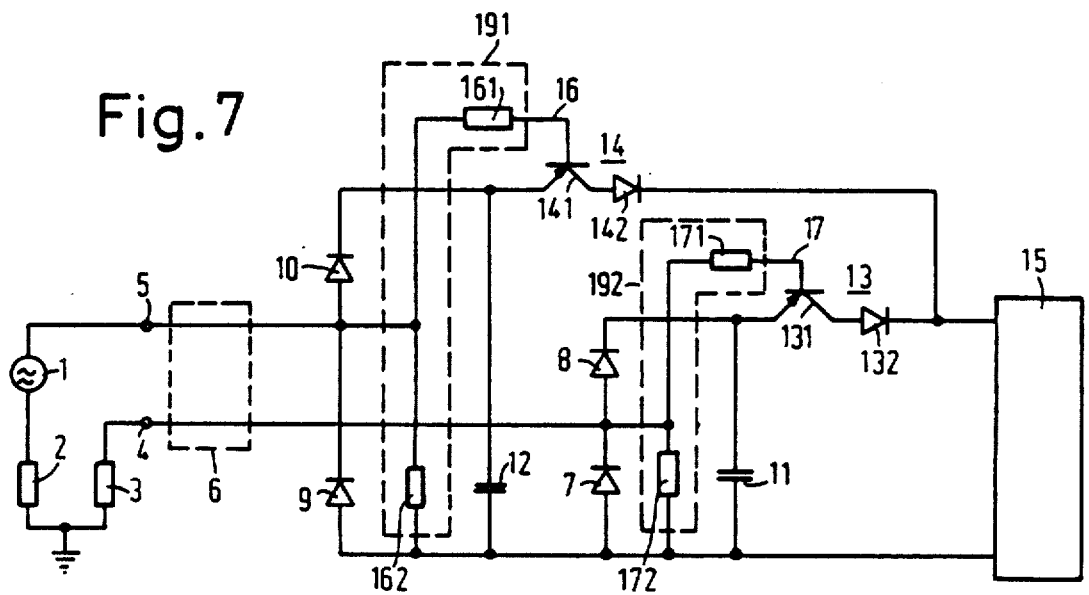
FIG. 7 shows a fourth embodiment.

FIG. 7 shows a further embodiment of the circuit arrangement according to FIG. 1 with a very simple embodiment of a control circuit. It is arranged in a part 191, 192 for each switching element 14, 13, respectively. The control circuit 191, 192 comprises for each of these switching elements 13, 14 an impedance network consisting of two resistors 161, 162 and 171, 172 each. Each part 191, 192 of the control circuit, i.e. each impedance network is connected by means of a tap—in the relevant example the connection between the resistors 161, 162 and 171, 172—to the associated terminal 5, 4, respectively of the power supply mains. Each circuit part is connected by means of a first end connection—via the resistors 161, 171—to one of the control connections 16, 17 of the switching elements 14, 13, respectively. The parts 191, 192 of the control circuit are connected by means of a second end connection—via the resistors 162, 172—to the connection of the associated energy storage devices 11, 12 remote from the switching element. The switching elements 13, 14 each comprise a PNP transistor 131, 141 in the relevant embodiment. The transistors 131, 141 are connected by means of their emitters to the associated energy storage devices 11, 12, respectively, by means of their bases to the control connections 16, 17 and by means of their collectors to the load 15. A respective diode 132, 142 for taking up the reverse voltage in the case of differently charged energy storage devices 11, 12 is arranged in series with each of the collectors. The diodes 132, 142 may be arranged in a modification of the arrangement in accordance with the diodes 55 and 56 of FIG. 6. When separating the common (in FIG. 7) connection of the diodes 7, 9 of the energy storage devices 11, 12 and the resistors 162, 172, the latter remain connected to the associated energy storage devices 11, 12.

The arrangement of FIG. 7 provides a simple control of the switching elements 13, 14, depending on the conducting phases of the rectifier stages and particularly the diodes 8 and 10. The PNP transistors 131 and 141 can only become conducting when a voltage which is negative with respect to the emitter terminal is present at their base terminals (diode forward voltage of approximately 0.7 V); the associated diode 8, 10 of the corresponding rectifier stage must thus be reverse biased with at least this voltage and should therefore not be conducting. The diode forward voltage or the base-emitter forward voltage of the PNP transistors 131, 141 thus supplies a "security gap"—between the conducting phase of the rectifier stage and the conducting phase of the associated switching elements. These conducting phases therefore cannot overlap each other with respect to time. The resistors 161, 162, 171, 172 are as high ohmic as possible for reducing the losses caused by these resistors and for reducing a possible coupling of interferences via the current paths produced by these resistors. Nevertheless, in order to achieve sufficiently high base currents at the control terminals 16, 17, i.e. base currents by which the PNP transistors 131, 141 can be rendered conducting without any problem, transistors having a current gain as high as possible are used. Preferably, the switching elements 13, 14 may also be formed with Darlington transistors.

The arrangement of the control circuit 191, 192 according to FIG. 7 has the additional advantage that the control signals supplied by this arrangement to the control terminals 16, 17 can be combined in a simple manner with further control signals for the switching elements 13, 14, for example for clocking the switching elements 13, 14, by inserting corresponding combination rids in the control terminals 16, 17.

Apart from clocking the switching elements 13, 14, such additional control signals may preferably also be used to bridge disturbances in an alternating voltage of the power supply mains by which the charging of one of the energy storage devices is disturbed, and particularly the drop-out of a halfwave of this alternating voltage, and without a drop in the load voltage. To this end the cycles of the conducting phases of the switching elements 13, 14 are accelerated after predetermined periods by given time intervals until the original association of the conducting phases with the alternating voltage is reached again. In the example of FIG. 7 the control signals at the control terminals 16, 17 for the switching elements 13, 14 are inverted in a simple manner for a given period. The measure can however also be used for a circuit arrangement with a multi-terminal power supply mains, for example according to FIG. 3. Then the association of the control signals with the switching elements 33, 34, 35 is cyclically exchanged. This cyclic exchange generally passes a plurality of stages until the original association of the conducting phases with the alternating voltage is achieved.

Figure 8:
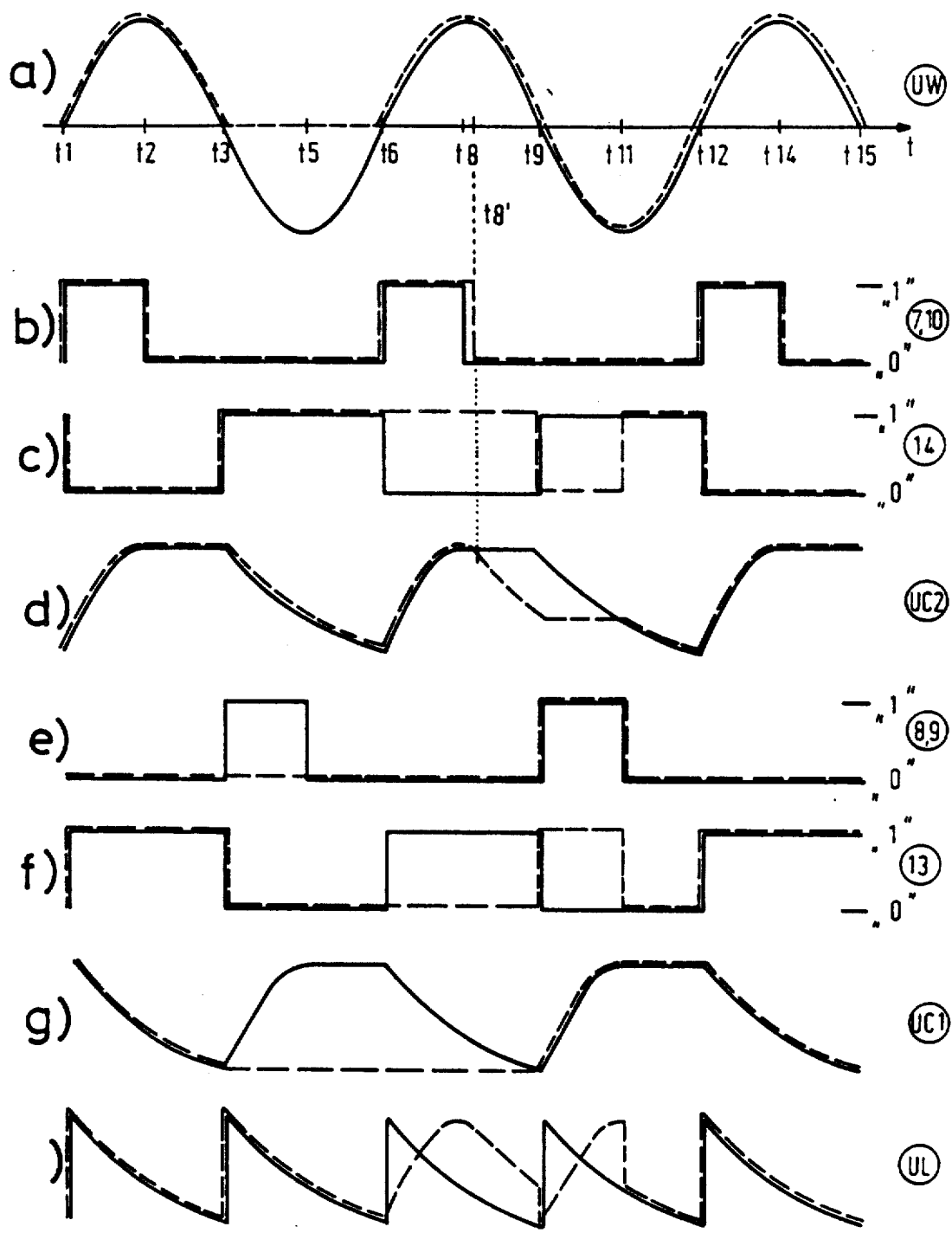
FIG. 8 shows diagrams for an example of a method of interference suppression.

The processes will hereinafter be separately described with reference to a simple embodiment of a two-terminal power supply mains. In FIG. 8, similarly as in FIG. 2, the variations with respect to time of some voltages and the status variables of a circuit arrangement according to FIG. 1 or FIG. 7 are shown, in which again the same reference numerals are used. In addition to the voltages known from FIG. 2 the diagrams according to FIGS. 8b, c, e and f show status variables corresponding to the state variables of FIGS. 4 and 5 for the conducting and blocked states of the diodes 7, 10 of the second switching element 14, the diodes 8, 9 and the first switching element 13. The normal operation according to FIG. 2 is shown in solid lines while the operation in case of interference, to be described, is shown by means of broken lines. In contrast to the mode of operation shown in FIG. 2 a mode of operation has been assumed in FIG. 8 in which the energy storage devices 11, 12 are completely discharged during the conducting phases of the associated switching elements 13, 14. The conducting phases of the rectifier stages, i.e. the diodes 7, 10 and 8, 9 according to FIGS. 8 b and e then already start at the zero-crossing of the mains alternating voltage UW and end at their subsequent peak, while each conducting phase of the switching elements 13, 14—shown in FIGS. 8 f and c, respectively—invariably amounts to a halfwave of the mains alternating voltage UW. In accordance with the decrease of the voltages UC1 and UC2—shown in FIGS. 8g and d—the voltage UL also decreases at the load 5—shown in FIG. 8h—down to zero. Based on the fact that the starts of the conducting phases of the rectifier arrangement 7 to 10 coincide with the zero-crossings of the mains alternating voltage UW, the instants t4, t7, t10, t13 etc. will be identical to the instants t3, t6, t9, t12 etc.; the first-mentioned denominations are therefore omitted in the diagram according to FIG. 8a, as compared with FIG. 2a.

As a disturbance illustrated in FIG. 8 it is assumed that the first negative halfwave of the mains alternating voltage UW has completely dropped out. This voltage thus disappears in the period between the instants t3 and t6. Up to the instant t3 there is still normal operation. In the period between the instants t3 and t5, however, the first energy storage device 11 normally charged at the instant t3 is not recharged again. The voltage UC1 consequently maintains the value of zero which was reached at the instant t3. The associated conducting phase of the first rectifier stage, particularly the diode 8 drops out; in FIG. 8e the associated status variable remains in the state "0". The interference so far has no influence on the supply of the load 15 because up to the instant t6 the second energy storage device 12 initially supplies energy and the voltage UC2 decreases to the value of zero as in normal operation.

The control circuit is now formed in such a manner that it recognizes whether or not there is a correct charge of the first energy storage device 11 when switching over the conducting phases of the switching elements 13, 14, i.e. when switching on the conducting phase of the first switching element 13 in the case of normal operation. If this charge is not effected in the disturbed state of operation, the control circuit automatically switches further by a given time interval in the cycle of the conducting phases. In the example of FIG. 8 half a period of the mains alternating voltage UW is skipped in the normal switching cycle of the switching elements 13, 14 and the cycle of the conducting phases is thus reduced by this time interval. The end of the conducting phase of the second switching element 14 at the instant t6 is thus not followed, as in normal operation, by a blocked state which lasts until the instant t9, but by the state which, viewed from the instant t6 in normal operation would still be in the future by the time interval by which the cycles are reduced in the relevant case of interference. This is the next conducting phase of the second switching element 14 starting at the instant t9 in normal operation. Starting at the instant t6, this conducting phase now follows; in a corresponding manner the cycle of the conducting phases is also accelerated by the period between the instants t6 to t9 in the state of the first switching element 13 and the succession of the states with respect to time follows the instant t6, as would occur in normal operation from the instant t9.

In accordance with the changed states of the switching elements 13, 14 the load 15 is supplied in the interval between the instants t6 and t9 via the second switching element 14 and hence from the second energy storage device 12, while the first energy storage device 11 initially remains separated from the load 15. The second energy storage device 12 is charged by the power supply mains simultaneously in the interval between the instants t6 and t8. In such a large disturbance case as the one described, the interference-suppressing separation between the power supply mains 1 to 5 and the load 15 is eliminated during short periods of time. In the period between the instants t8 and t9, however, the mains alternating voltage UW decreases at a faster rate than does the voltage UC2 at the capacitor 12 due to its supply of energy to the load 15. Thus, the conducting phase of the first rectifier stage, particularly the diode 7 is terminated from the instant when the mains alternating voltage UW drops below the voltage UC2 at the second energy storage device 12, and hence the separation of the power supply mains 1 to 5 from the load 15 is reestablished. This is effected at the instant t8'. In the period between the instants t8' and t9 the load 15 is supplied from the second energy storage device 12 in the same manner as in normal operation.

At the instant t9 the switching elements 13, 14 change their state in the cycle newly started from instant t6; the first switching element 13 comes in to a conducting phase whereas the second switching element 14 is blocked. Consequently, the discharge of the second energy storage device 12 by the supply of the load 15 remains interrupted for the time being; since also a further charge of the second energy storage device 12 still does not begin, the voltage UC2 initially remains at a constant value. Simultaneously with the conducting phase of the first switching element 13, however, a conducting phases also occurs at the second rectifier stage, particularly at the diode 9. Consequently both the first energy storage device 11 and the load 15 are supplied from the power supply mains 1 to 5 as from the instant t9. Also in this period the separation between the load 15 and the power supply mains 1 to 5 is eliminated again.

After a predetermined period of time, which in the relevant example extends from the instant t6 until the instant t11, the cycles of the conducting phases of the switching elements 13, 14 are once more reduced by a given time interval—again by half a period of the mains alternating voltage UW. As a result, from the instant t11 the original association of the conducting phases with the mains alternating voltage UW occurs again so that with respect to this association the normal operation of the circuit arrangement is reestablished. Consequently, the first switching element 13 changes to the blocked state at the instant t11 and the second switching element 14 changes to the conducting state. The first energy storage device 11 has reached its maximum charge again at the instant t11 and initially remains in this state. The second energy storage device 12 is again connected to the load via the second switching element 14 and is further discharged thereby.

At the instant t12 the first switching element 13 is switched to the conducting state and the second switching element 14 is switched to the blocked state, as in normal operation. The load 15 is then supplied again from the first energy storage device 11, while the second energy storage device 12 is again charged from the power supply mains 1 to 5. The normal operation is thereby achieved again, also with reference to the charge conditions of the energy storage devices 11, 12.

The resultant variation with respect to time of the voltage UL at the load 15 in FIG. 8h shows that with the afore-described control of the switching elements 13, 14 and without a larger dimensioning of the energy storage devices an uninterrupted supply of the load 15 can also be achieved in the described case of interference.

Another procedure for suppressing disturbances, caused by drop-outs when charging the energy storage devices, could be to charge the two energy storage devices 11, 12 in parallel while simultaneously supplying the load 15 by means of the halfwave subsequent to the disturbed halfwave of the mains alternating voltage UW. However, the separation between the power supply mains 1 to 5 and the load 15 would then also be eliminated for that time, and additionally energy losses due to recharging processes between the two energy storage devices 11, 12 would occur, and finally a larger number of circuit components would be required due to the diodes 55, 56 and 132, 142 so as to enable the balancing processes between the energy storage devices 11, 12 anyway and thus realise a parallel charge of the energy storage devices 11, 12.

Corresponding to the present example for a two-terminal power supply a similar disturbance of one of the alternating voltages at the terminals in a multi-phase supply mains can be bridge, and without having to increase the capacity of the energy storage devices. The number of steps in which the cycles of the conducting phases are reduced preferably corresponds to the number of terminals. Basically, it is the next switching element which is always changed over after the charge of one of the energy storage devices has dropped out at the start of the conducting phase of the associated switching element, and a conducting phase is started for this next switching element because the corresponding energy storage device, unlike the disturbed storage device, has enough energy for supplying the load. By means of further similar jumps there is a return to the original cycle of the conducting phases.

We claim:

1. A circuit arrangement for supplying a load with energy from a power supply mains conveying at least one alternating voltage comprising: a rectifier arrangement which for each terminal of the power supply mains comprises a rectifier stage constituted as a first branch of a bridge rectifier, for each rectifier stage an energy storage device can be charged via and is connected to said stage in accordance with a complementary branch of the bridge rectifier, for each terminal a switching element is provided for connecting each energy storage device to the load and a control circuit by which the switching elements are switchable to conduct outside charge time intervals (conducting phases of the rectifier stages) cyclically following the charge of the energy storage devices from the power supply mains via the rectifier stages.

2. A circuit arrangement as claimed in claim 1 wherein the control circuit comprises an impedance network for each switching element, each network having a tap connected to the associated terminal of the power supply mains, a first end connection which is connected to a control terminal of the associated switching element and a second end connection which is connected to a terminal of the associated energy storage device remote from the switching element.

3. A circuit arrangement as claimed in claim 1, wherein the load comprises a switched mode power supply and the switching elements serve as its chopper switches.

4. A circuit arrangement as claimed in claim 3, wherein the control circuit comprises a device for controlling the switching elements dependent on the voltage which is present at the energy storage device supplying energy to the load, and on the energy taken up by the load.

5. A circuit arrangement as claimed in claim 1, characterized in that the switching elements are transistors and in that a diode is connected in each energy transfer circuit comprising the associated switching element between each one of the energy storage devices and the load.

6. A circuit arrangement as claimed in claim 5, wherein the switching elements are connected to a first terminal of the load, the diodes are connected to a second terminal of the load, and the connections between the stages facing the diodes and the associated energy storage devices are cyclically interchanged in accordance with the sequence of the conducting phases.

7. A circuit arranged as claimed in claim 5, wherein the control circuit comprises an impedance network for each switching element, each network having a tap connected to the associated terminal of the power supply mains, a first end connection which is connected to a control terminal of the associated switching element and a second end connection which is connected to a terminal of the associated energy storage device remote from the switching element.

8. A circuit arrangement as claimed in claim 5, wherein the load comprises a switched mode power supply and the switching elements serve as its chopper switches.

9. A circuit arrangement as claimed in claim 5, wherein the control circuit is arranged in such a way that after the occurrence of a disturbance in an alternating voltage of the power supply mains by which the charge of one of the energy storage devices is disturbed, particularly when a halfwave of the alternating voltage has dropped out, the cycles of the conducting phases of the switching elements are reduced after predetermined periods by given time intervals until the original association of the conducting phases with the alternating voltage is reached again.

10. A circuit arrangement as claimed in claim 1, characterized in that time intervals in which the switching elements are switched to conduct (conducting phases of the control switching elements) adjoin each other in a non-overlapping manner.

11. A circuit as claimed in claim 10, for supplying energy from a power supply mains which has at least two terminals, characterized in that the control circuit is operative to start the conducting phase of each switching element at an instant at which the voltage at the associated terminal of the power supply mains becomes smaller than at least one of the voltages at the other terminals and extends over a part of the period of the alternating voltage corresponding to the number of terminals.

12. A circuit arrangement as claimed in claim 11, further comprising means for applying the voltages of the terminals of the power supply mains to the control circuit for controlling the switching elements.

13. A circuit arrangement as claimed in claim 11, characterized in that the switching elements are transistors and in that a diode is connected in each energy transfer circuit comprising the associated switching element between each one of the energy storage devices and the load.

14. A circuit arrangement as claimed in claim 13, wherein the switching elements are connected to a first terminal of the load, the diodes are connected to a second terminal of the and the connections between the rectifier stages facing the diodes and the associated energy storage devices are cyclically interchanged in accordance with the of the conducting phases.

15. A circuit arranged as claimed in claim 11, wherein the control circuit comprises an impedance network for each switching element, each network having a tap connected to the associated terminal of the power supply mains, a first end connection which is connected to a control terminal of the associated switching element and a second end connection which is connected to a terminal of the associated energy storage device remote from the switching element.

16. A circuit arrangement as claimed in claim 11, wherein the control circuit is arranged in such a way that after the occurrence of a disturbance in an alternating voltage of the power supply mains by which the charge of one of the energy storage devices is disturbed, particularly when a halfwave of the alternating voltage has dropped out, the cycles of the conducting phases of the switching elements are reduced after predetermined periods by given time intervals until the original association of the conducting phases with the alternating voltage is reached again.

17. A circuit arrangement as claimed in claim 11, wherein the load comprises a switched mode power supply and the switching elements serve as its chopper switches.

18. A circuit arrangement as claimed in claim 10, further comprising means for applying the voltages of the terminals of the power supply mains to the control circuit for controlling the switching elements.

19. A circuit arrangement as claimed in claim 1, further comprising means for applying the voltages of the terminals of the power supply mains to the control circuit for controlling the switching elements.

20. A circuit arrangement as claimed in claim 1, wherein the control circuit is arranged in such a way that after the occurrence of a disturbance in an alternating voltage of the power supply mains by which the charge of one of the energy storage devices is disturbed, particularly when a halfwave of the alternating voltage has dropped out, the cycles of the conducting phases of the switching elements are reduced after predetermined periods by given time intervals until the original association of the conducting phases with the alternating voltage is reached again.

21. A circuit for supplying electric energy to a load from an AC voltage source comprising:
   a plurality of input terminals for supplying the AC voltage to the circuit,
   a bridge rectifier stage including a plurality of rectifier branches coupled to respective ones of said input terminals,
   a corresponding plurality of energy storage devices coupled to respective ones of said rectifier branches such that said storage devices receive DC voltages,
   a corresponding plurality of controlled switching elements for coupling respective ones of said storage devices to the load, and
   a control circuit coupled to said switching elements so as to cyclically switch the switching elements into conduction during mutually exclusive time intervals, which time intervals are arranged to occur outside of the time periods during which the switching element's respective storage device receives a DC voltage from the input terminals via the bridge rectifier stage.

22. An energy supply circuit as claimed in claim 21 wherein the control circuit is responsive to the AC voltages at said input terminals to trigger each switching element into a conduction phase at an instant of time when the AC voltage at its associated input temrinal drops below the AC voltage on at least one other input terminal, said conduction phase lasting for a fraction of the period of the AC voltage, said fraction being determined by the number of input terminals.

23. An energy supply circuit as claimed in claim 22 wherein the control circuit is further responsive to the DC voltages at said storage devices for controlling the conduction of said switching elements.

24. An energy supply circuit as claimed in claim 21 wherein said control circuit is responsive to the zero crossovers of the AC voltage appearing at said input terminals to initiate conduction in respective ones of the switching elements.

25. An energy supply circuit as claimed in claim 21 wherein said control circuit is responsive to at least one AC voltage at an input terminal so as to trigger the switching elements into conduction such that conduction phases of the switching elements occur one after another in a non-overlapping sequence.

26. An energy supply circuit as claimed in claim 21 wherein each storage device is coupled to the load via an energy transfer circuit that includes a respective one of the switching elements, and wherein said energy supply circuit further comprises a corresponding plurality of diodes each of which is connected in a respective one of said energy transfer circuits between the load and a respective one of the energy storage devices.

27. An energy supply circuit as claimed in claim 21 wherein the control circuit comprises an impedance network for each switching element, each impedance network being coupled between a control terminal of the switching element and a terminal of its respective storage device remote from the switching element, each impedance network having a tap coupled to a respective input terminal associated with said respective storage device.

28. An energy supply circuit as claimed in claim 21 wherein the load comprises a switched mode power supply in which said switching elements serve a dual function as the switches of the switched mode power supply.

29. An energy supply circuit as claimed in claim 21 wherein the control circuit is controlled jointly by the AC voltages at said input terminals and the DC voltages at said storage devices thereby to control conduction of said switching elements.

30. An energy supply circuit as claimed in claim 21 wherein the control circuit is controlled at least partly by the AC voltages at said input terminals such that, in response to a disturbance of the AC voltage at a pair of input terminals, switch control voltages supplied by the control circuit to the switching elements are exchanged for a period of time thereby to adjust the switching sequence so as to maintain a supply voltage to the load despite said disturbance, whereafter the control circuit resumes the normal switching sequence at a time subsequent to termination of said disturbance.

* * * * *